United States Patent
Striuli

(10) Patent No.: US 7,177,666 B2
(45) Date of Patent: Feb. 13, 2007

(54) ACCESS NETWORK FOR MOBILE TELECOMMUNICATIONS AND METHOD FOR DEVELOPING RADIO COVERAGE

(75) Inventor: Alessandro Striuli, Venezia Mestre (IT)

(73) Assignee: ITEC S.r.l., Turin (IT)

( * ) Notice: Subject to any disclaimer, the term of this patent is extended or adjusted under 35 U.S.C. 154(b) by 0 days.

(21) Appl. No.: 10/487,306

(22) PCT Filed: Sep. 4, 2002

(86) PCT No.: PCT/IB02/03594

§ 371 (c)(1),
(2), (4) Date: Mar. 15, 2004

(87) PCT Pub. No.: WO03/021989

PCT Pub. Date: Mar. 13, 2003

(65) Prior Publication Data

US 2005/0130622 A1     Jun. 16, 2005

(30) Foreign Application Priority Data

Sep. 4, 2001    (IT)            VE2001A0038

(51) Int. Cl.
*H04B 1/38* (2006.01)
*H04B 7/204* (2006.01)
(52) U.S. Cl. .................... 455/561; 370/319
(58) Field of Classification Search ............ 455/550.1, 455/552.1, 553.1, 561, 524, 525; 370/319, 370/327, 295, 296, 343, 344, 334, 329
See application file for complete search history.

(56) References Cited

U.S. PATENT DOCUMENTS

| | | | | |
|---|---|---|---|---|
| 5,481,546 A | * | 1/1996 | Dinkins | 370/329 |
| 5,515,378 A | * | 5/1996 | Roy et al. | 370/334 |
| 6,411,824 B1 | * | 6/2002 | Eidson | 455/561 |
| 6,788,652 B1 | * | 9/2004 | Hwang | 370/282 |
| 6,898,429 B1 | * | 5/2005 | Vialen et al. | 455/432.1 |

FOREIGN PATENT DOCUMENTS

EP        1 122 962 A1 *   8/2001

* cited by examiner

*Primary Examiner*—Charles N. Appiah
(74) *Attorney, Agent, or Firm*—Levine & Mandelbaum

(57) ABSTRACT

A telecommunications network for mobile phone users comprising a user subsystem and a transport subsystem associated by means of an access subsystem, which connect to them respectively through a user access communication interface and a transport access communication interface suitable to allow the exchange of data flows between said subsystems, the access subsystem identifying a coverage area of the telecommunication network for mobile users characterized in that said access subsystem determines on the territory a separated cellular coverage for the transmission from the user subsystem to the network with respect to that from the network to the user subsystem, said access subsystem STA) being composed from, in addition to bidirectional base stations, as known, also from stations suitable to support monodirectional transmission in uplink or in downlink.

10 Claims, 1 Drawing Sheet

ACCESS NETWORK FOR MOBILE TELECOMMUNICATIONS AND METHOD FOR DEVELOPING RADIO COVERAGE

BACKGROUND OF INVENTIONS

The present invention relates to a telecommunications network for mobile users, said telecommunications network for mobile users comprising a user's subsystem and a transport subsystem connected by means of an access subsystem, which offers them respectively a user access communications interface and a transport access communications interface, suitable to permit the exchange of the information flows among said subsystems, said access subsystem identifying a coverage area of the cellular telephone network, through the composition of elementary coverage areas called cells, each one generated by a radio base station that ensures the birectional communication among user subsystems and access subsystem.

Based on various analyses, it is expected that in a short time we will see a large increase in the quantity of information exchanged between users equipped with mobile radiotelephone terminals and the networks of the providers of such services.

In light of such future needs, various national and international organizations (e.g. ITU, ETSI, FCC, etc.) dealing with regulations affecting radio frequencies allocation and utilization and the relative standards of data processing and signal modulation techniques, agreed on the definition of standards (or a group of standards like the IMT 2000) which allows a significant increase in the velocity of exchange of data between the mobile networks and the user mobile terminal and vice versa. The IMT 2000 group of standards, for example, includes the new standards called CDMA 2000 and Universal Mobile Telecommunications System (UMTS) or 3G (third generation) that allow video-conferencing and compatibility with the protocols of Internet networks (e.g., Ipv6) with other networks of the same family (e.g., DECT), and with the previous generation (2G) wireless telephone networks (e.g., GSM and PCS) and their improved data transport versions such as GPRS, EDGE, etc., (usually referred to as 2.5G).

At the same time, methodologies and standards are continuously developed and perfected for the treatment of signals able to minimize the bandwidth requirements for digital transmissions of audio and video signals permitting the efficient transport of music, voice and images on digital networks such as Internet, Intranet and the like.

There is, therefore, reason to believe that the diffusion of new terminals capable of efficient connection to the Internet, to watch videos and to reproduce data, voice, music and television files downloadable from the Internet will bring significant growth in the quantity of data carried by the terrestrial radio networks for the next generation of mobile phones. For example, the third generation cellular systems, using the UMTS standard, are designed for multimedia communications. These person-to-person communications can be improved with quality images and/or video and access to information or services on the private or public networks can benefit from the high available data rate and from the increased communication flexibility of such systems.

These systems offer the following characteristics:
variable bit rate to furnish bandwidth compatible with the service needed (from 16 kbps for voice to 2 Mbps for "High Multimedia");
multiplexing services with different quality requirements in a single connection;
delay requirements for real time traffic;
quality requirements from 10% frame error to $10^{-6}$ bit error rate;
compatibility with 2G systems (e.g., GSM) and handover intersystems for better coverage and traffic balance;
high efficiency in spectrum utilization
compatibility of Frequency Division Duplex (FDD) and Time Division Duplex (TDD) connection modes
support of asymmetric traffic for uplinks (from user to provider) and downlinks (from provider to user).

Among the most important characteristics of the network based on the UMTS standard are the increased bit rate for the user, compatibility with Internet standards, the ability to run multimedia files and the ability of connecting to the terminal in an "always on" mode.

It is also logical to envision that in the beginning the use of the UMTS network will be primarily made of voice and Internet traffic and that the rate of multimedia traffic will increase over time.

Since the requested information will frequently be available through the Internet, it is important to provide efficient management of TCP/UDP/IP traffic on the UMTS network. In order to be successful, the UMTS network must be able to support a wide array of applications from different requirements for performance and quality of service.

Further, there are technologies in rapid and constant development, which compete in the production of portable radio terminal (user terminals), which are able to incorporate functions beyond basic telephones services, such as the various additional complex functions. These include graphic visualization with good resolution, typical functions of Personal Computers, capability to interpret and process various standards and protocols of the Internet, storage of large quantities of data, elaboration and reproduction of audio and video files based on various standards, ability to run serial interfaces via cable to infrared and radio for data exchange over short distances with other digital units, reception and elaboration of GPS signals, execution of complex interactive games, quick execution of cryptographic codes and voice recognition and synthesis, etc.

All of these capabilities of the user terminal necessary to support the vast array of services foreseen by the 3G mobile telecommunications networks will result in a notable increase in energy consumption. This increase in energy consumption over and above today's 2G terminals (primarily for telephones) will make even more important methodologies aimed at optimizing energy consumption.

Thus, to furnish a service qualitatively acceptable to customers, the wireless network providers will be forced to continuously upgrade their capacity to meet increased demand. If the demand for new mobile network services continues, problems can surface with regard to capacity both on the transport networks and the access networks. To augment the transport capacity, it will be necessary to increase the capacity of various connections, which are theoretically limited only by cost. The access capacity is limited instead by the finite frequency band assigned to each provider. Reducing the dimensions of the coverage cells and thus increasing their numbers can manage the increases in capacity, but this solution presents technical problems if pushed to the extreme and is an endeavor that has its limits.

The UMTS network consists of, at the network architecture level, an assembly of network elements, each with a specific function. At the level of standards, both the logical elements and the open interfaces are defined in a way that makes automatically possible to pick out the physical elements of the network as well.

The presence of open interfaces, in particular in the UMTS Terrestrial Radio Access Network (UTRAN), allows interconnections to the UMTS network in ways not explicitly foreseen by the current standards.

Documentation of the detailed description of services and standardized performance (or those currently being defined) for the 2.5G and 3G mobile telecommunications networks has been produced by the Third Generation Partnership Project (3GPP) and the Third Generation Partnership Project 2 (3GPP2). A synthesis of this information is available in publications such as, *"WCDMA for UMTS"* by Holma and Toskala, 2000, John Wiley & Sons, while FIG. 1, described below, shows some of the UMTS network elements necessary to describe the invention.

FIG. 1 represents a block diagram at the highest architectural level of a telecommunications network for mobile phone users UNET of the type noted in the UMTS standard. It comprises three subsystems all interconnected as follows:

user terminal subsystem STU that is indicated in the standard as "User Equipment". This subsystem makes up the user terminal system, i.e. the portable terminal, such as for example, a cellular phone. This user terminal subsystem is interconnected to the telecommunications network for mobile phone users UNET, in particular to an access subsystem STA, by means of a user access interface Uu through which a data and voice signal TS is received and transmitted. This user access Uu interface, which has been referred to as an open interface so as to allow it to function in association with high quality terminals. The user terminal subsystem is made of a user identification module USIM, similar to the SIM card of the GSM standard, and the mobile equipment ME, i.e. the cellular phone, that communicates through appropriate interface equipment Cu;

access subsystem STA: this subsystem constitutes of the access network for the UMTS standard, the previously mentioned system UTRAN and connects to the transport network STT by means of a transport access Iu interface;

transport subsystem STT: said transport subsystem STT identified as "Core Network" in the UMTS standard constitutes the transport network of the UMTS system. Said subsystem STT, in addition to being connected by means of a transport access Iu interface to the access subsystem STA, must be able to interconnect with all the other existing networks (external networks, PSTN, ISDN, B-ISDN, Internet, etc.), which are identified in FIG. 1 by a block EXTNET. In this transport subsystem STT are comprised the information switching capabilities that are typical of cellular telephone systems. Namely, a Mobile Service Switching Center (MSC), a Home Location Register (HLR) database, a Visitor Location Center (VLR) database, an interconnection node or gateway GMSC, a node for the management of the packet switching SGSN Serving GPRS Support Node, and an interconnection node, or gateway, of the apparatus for packet switching GGSN (Gateway GPRS Support Node).

In FIG. 1 it is shown, inside of the access subsystem STA, the base stations SNB that correspond to the base stations shown as Node-B in the UMTS standard. Namely, the radio stations disseminated through the territory of the mobile telephone system. Their principal function consists of exchanging, by means of the radio interface Uu, the data and voice signal TS with the user terminal subsystem STU. These base stations SNB also run the principal radio resources like, for example, the internal power control. Inside the access subsystem STA is comprised a radio network controller CRR as it is defined on the UMTS standard. This radio network controller CRR has complete control of all the radio resources in its domain. Namely, the base stations SNB connected to it by means of an appropriate controller station interface Iub.

The radio network controller CRR controls the working of one or more base stations SNB, controls the setting of radio channels (establishment and release connections), frequency hopping, internal handovers and other functions, communicating with the transport subsystem STT, in particular, with the switching center MSC. In large urban areas, there are a large number of base stations SNB controlled by a small number of radio network controllers CRR.

Each base station SNB is able to manage through the user/access interface Uu the connection to the network UNET of all the user subsystems STU that are located in the area surrounding the base station SNB; such an area, managed by one only base station SNB, is called cell. Base stations SNB are placed over the territory in a way to cover continuously the territory itself, minimizing the areas in which radio coverage is not sufficient. The aim is to allow the moving user subsystem STU to be connected continuously to the UNET network.

The user subsystem STU that are inside a certain cell exchange data bidirectionally with the base station SNB that identifies that cell: thus communication from user subsystem STU to base station SNB (Uplink transmission) and from base station SNB to user subsystem STU (downlink transmission) is obtained.

Due to the predictable rise in requests for multimedia information, the UNET network described in FIG. 1, must carry growing traffic from the external networks EXTNET to the transport/access interface Iu and access/user Uu in two directions.

As mentioned, to furnish a service qualitatively acceptable to the customers, the providers of UMTS type networks and wireless in general, will be forced to continue their investment in balancing network capacity with the increasing growth in demand.

In order to solve the above cited problem of increasing download data requirements, a telecommunication network has been disclosed by document EP 1 122 962 A, where several additional radio base stations provide additional monodirectional downlink channels. This solution has the problem of increasing electromagnetic pollution due to the irradiated electromagnetic power, and it does not solve the problem of the increasing consumption of the third generation terminals.

SUMMARY OF THE INVENTION

The present invention has for aim to solve the cited problems and to indicate an improved and more efficient telecommunication network for mobile phone users.

Under this frame, the main object of the present invention is to indicate a telecommunications network for mobile phone users that is able to serve a greater number of users with the same number of transmitting stations.

A further object of the present invention is to indicate a telecommunications network for mobile phone users that allows for reducing the energy consumption in transmission on the terminal side.

A further object of the present invention is to indicate a telecommunications network for mobile phone users that is compatible with the new cellular phone standards, in particular the UMTS standard.

In order to achieve such aims, it is the object of the present invention to provide a telecommunications network for mobile users and/or base station and/or radio network controller and/or a method/means for sending information incorporating the features of the annexed claims, which form an integral part of the description herein.

DESCRIPTION OF THE DRAWINGS

Further objects, features and advantages of the present invention will become apparent from the following detailed description and annexed drawings, which are supplied by way of non limiting example, wherein.

DESCRIPTION OF THE PREFERRED EMBODIMENT

The invention is based on the observation that a large amount of new multimedia traffic will manage bidirectional connections developed using Frequency Division Duplex (FDD) technology. Toward this end, it has been conceived a network architecture that, keeping in mind the new standard, allows to significantly increase the capacity in the most cost effective manner possible.

It seems desirable, therefore, to develop future UMTS terrestrial networks, including base stations, that manage radio uplink, channels called uplink base stations SNBu and radio downlinks, called downlink base stations SNBd. It is allowed moreover that these base stations can exist in different numbers (at least in some coverage zones) and that, consequently, the two separate coverages, uplink and downlink, can be generated with different numbers of cells.

Figure 1:
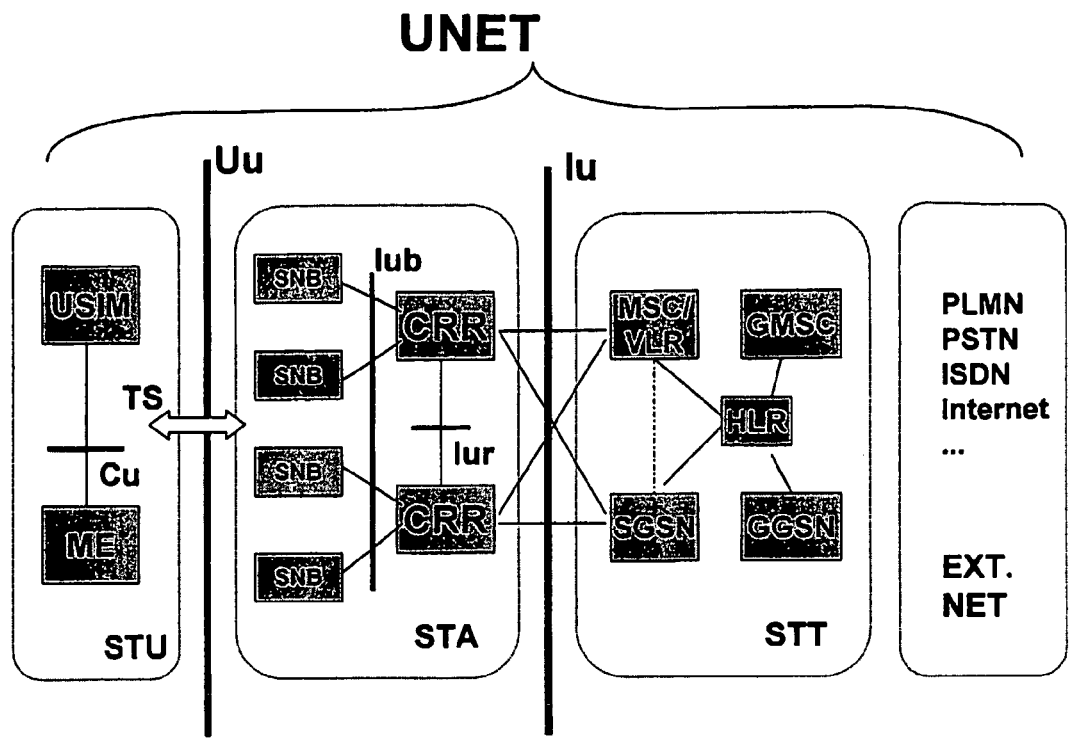
FIG. 1 shows a basic diagram of a mobile telecommunications network according to the prior art.

The inventive concept consists then in a telecommunications network comprising three types of base stations:

1) a bidirectional base station SNB as shown in the FIG. 1 (called Node-B in UMTS terminology);
2) a downlink base station SNBd that manages only the transmission channels using FDD technology in the downlink direction. The station SNBd comprises a device which performs a subset of functions carried out by the bidirectional base stations SNB, and so can physically coincide with the base stations SNB, as shown in the FIG. 2, but with the exception that in some cases said base station SNB can be utilized without managing the uplink transmission channels with FDD technology and used instead for cellular coverage. In this last case, the base station SNB will completely run the bi-directional connections using Time Division Duplex (TDD) technology and all the downlink channels (both those used for broadcast/multicast and those for bidirectional connections);
3) an uplink base station SNBu that runs only uplink transmitting channels using the FDD technology: this uplink base station SNBu is made up of a low emission (negligible) device. Since it performs a subset of functions performed by the normal bi-directional base stations SNB, it can physically coincide with the bidirectional base stations SNB, but can obtained in a much simpler and more costless way since the base stations SNBu, being specialized in managing uplink transmission channels using FDD technology can perform only the minimum necessary functions.

The utilization of low cost uplink base stations SNBu in greater number than the downlink base stations SNBd (that would also run the TDD connections) allows to have a greater number of uplink channels, if the radio channels are utilized according to the form indicated in the documents that describe allocation of the spectrum for the 3G mobile telecommunications systems. Such availability allows the utilization of at least one (or more than one) less physical channel in the uplink section and all without reducing the number of bidirectional symmetrical connections permitted by the system.

The channels (or the frequency bands) thus spared can be used advantageously in other ways: for example, to support TDD connections or to house broadcast/multicast channels.

Figure 2:
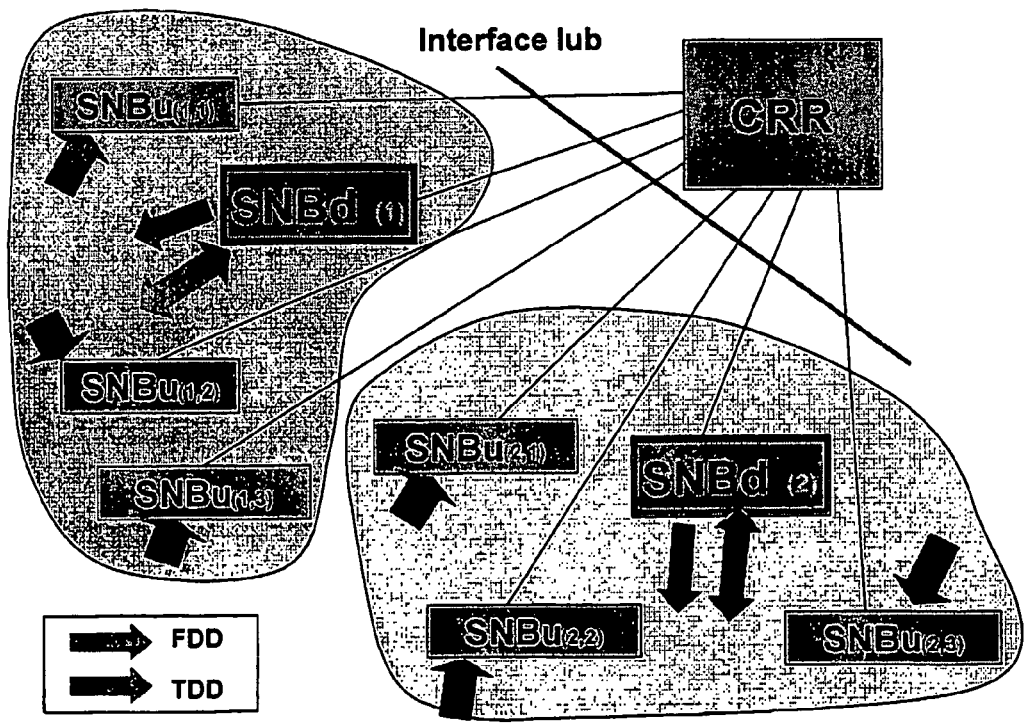
FIG. 2 shows a basic diagram of the access subsystem STA of a telecommunications network for mobile users UNET according to the invention.

FIG. 2 shows a diagram of an access subsystem STA diagram composed of radio base stations according to the invention. In this figure two downlink base stations are shown, indicated respectively with SNBd(1) and SNBd(2), that communicate both in FDD modem indicated through arrows F, and in TDD mode, indicated through arrows T, to which are respectively associated three uplink base stations $SNBu_{(1,1)}$, $SNBu_{(1,2)}$, $SNBu_{(1,3)}$, $SNBU_{(2,1)}$, $SNBU_{(2,2)}$, $SNBU_{(2,3)}$.

The access subsystem STA of the telecommunications network according to the invention originates a cellular coverage on the territory that is separated for uplink and the downlink transmission, in a different manner from what is provided in the known cellular network architectures.

Said access subsystem STA of FIG. 2 comprises thus, in additions to canonical base stations SNB apt to run bidirectional communications whit the user subsystem STU, also base stations SNBu suitable for supporting monodirectional uplink transmission and also base stations SNBd suitable for supporting monodirectional downlink transmission. In FIG. 2 only base stations SNBd are shown and not bidirectional base station SNB, since, as already mentioned, they can physically coincide.

Such access subsystem STA of FIG. 2 is included in the telecommunications network according to the invention in an analogous way to that shown in FIG. 1, i.e. constitutes the access network for UMTS standard, the previously mentioned UTRAN and connects to a transport subsystem STT through a transport-access interface Iu.

From the above description the features of the present invention as well as the relevant advantages thereof are clear.

In particular, are interesting the advantages of the base stations SNBu (mainly receiving), specialized in supporting uplink transmission.

In this regard it is observed that one of the most valuable resources for a mobile telecommunication services provider is, in addition to the licensed frequencies, the availability of the sites on which base stations SNB are installed; difficulties in finding sites are due essentially to their transmission function and to the fact that such stations generate an electromagnetical field, so that a special authorizations are required for installation.

Beyond the advantage already addressed, i.e., augmenting the capacity of the access subsystem as a whole with equal occupied frequencies and sites with transmission systems (that generate significant electromagnetic fields), the invention offers other advantages when applied.

One further advantage of the invention is that it makes power control less critical since, the uplink coverage cells being smaller, results to be reduced the variability of the distance of the users system from the base station uplink, and by consequence also the dynamics of the power control: whereas the eventual imprecision of power control will be on average of minor amplitude.

Another advantage is determined by the fact that the distance from the receiving base stations will always be less than that required in the case with only base stations according to the prior art, therefore, the user system will transmit with less power. This constitutes a double advantage: less energy consumption, making the batteries last longer, and less user exposure to electromagnetic radiation having lower intensity.

In addition, the telecommunications network for mobile users according to the invention is compatible with the UMTS and CDMA2000 standards and with future systems based on analogous architecture that makes use of open interfaces with improvements in preceding systems.

It is obvious that many changes are possible to the telecommunications networks for mobile phone users, base stations, radio network controllers and methods for transmitting data according to the present invention, without departing from the novelty spirit of the inventive idea.

It is also clear that in practical development of the invention, the forms we have illustrated are only examples and can be substituted with equivalent technical elements.

The base station, according to the invention, allows distinct cellular coverage for the downlink and uplink sections. FIG. 2 describes the only case in which there are more receiving cells or that the uplink coverage is denser, since this, the user communication to the network, is the portion currently more interesting, and that can be offered in the near future offering major economic advantages derived from the UMTS services to customers. Finally, it is clear that the telecommunications network according to the invention is not limited only to architecture foreseen by the UMTS standard. For example, it can be applied as well to the 2.5G standard.

The telecommunications network according to the invention can also be applied to integration with wireless Local Area Networks (LAN). The signals based on these protocols can be carried out by means of an access subsystem through picocells with limited mobility such as those found at supermarkets and airports, using UMTS (or GSM-GPRS or WCDMA or UMT-2000 or further actual or future cellular systems in evolution) telecommunications networks which, through the use of the invention, can offer special coverage for uplinks and downlinks.

The invention claimed is:

1. A telecommunications network for mobile phone users comprising a user subsystem and a transport subsystem associated by means of an access subsystem, which connect to them respectively through a user-access communication interface and a transport-access communication interface suitable to allow the exchange of data flows between said subsystems, said access subsystem identifying a coverage area of the telecommunication network for mobile users and comprising bidirectional radio base stations and monodirectional radio base stations wherein at least a part of the uplink communications between said user subsystem and said access subsystem are implemented by means of monodirectional radio base stations dedicated only to uplink coverage, said monodirectional radio base stations dedicated only to uplink coverage using a technique of transmissions separated in frequency for communicating with said user subsystem, said monodirectional radio base stations dedicated only to uplink coverage being located in the coverage area of the mobile telecommunications network.

2. A telecommunications network for mobile phone users according to claim 1 wherein at least a part of the downlink communications, that is communications from the radio base station to the mobile phone user, are implemented by means of monodirectional radio base stations dedicated only to downlink coverage, said monodirectional radio base stations dedicated only to downlink coverage using a technique of transmission separated in frequency, said monodirectional radio base stations dedicated only to downlink coverage having means to communicate with radio network controllers.

3. A telecommunications network for mobile phone users according to claim 1 wherein said monodirectional radio base stations dedicated only to uplink coverage comprise means to communicate with radio network controllers in the FDD technique.

4. A telecommunications network for mobile phone users according to claim 1 wherein said access subsystem comprises radio network controllers that comprise means to communicate with said monodirectional and bidirectional radio base stations.

5. A telecommunications network for mobile phone users according to claim 1 wherein said monodirectional and bidirectional radio base stations comprise means to communicate with the user subsystems, and that the user subsystems comprise means to communicate with said monodirectional and bidirectional radio base stations.

6. A telecommunication network for mobile phone users according to claim 1 wherein said monodirectional radio base stations dedicated only to uplink coverage comprise means for providing one or more control channels, said control channels being of bi-directional or monodirectional type.

7. A telecommunications network for mobile phone users according to claim 1 wherein said monodirectional radio base stations dedicated only to downlink coverage comprise means for providing one or more control channels, said control channels being of bi-directional or monodirectional type.

8. A telecommunications network for mobile phone users according to claim 1 wherein the network is based on the UMTS standard and access subsystem is based on the UTRAN standard.

9. A telecommunications network for mobile phone users according to claim 1 wherein the network is based on the 3G standards that make up the IMT2000 family.

10. Method for developing cellular coverage for a telecommunications network for mobile phone users using a FDD technique comprising the steps of implementing the radio coverage by means of bidirectional and monodirectional radio base stations, wherein at least a part of the uplink communications, that is communications from the mobile phone user to the radio base station, are implemented by means of monodirectional radio base stations dedicated only to uplink coverage, said monodirectional radio base stations dedicated only to uplink coverage using a technique of transmission separated in frequency for said uplink communications, said radio base stations dedicated only to uplink coverage being located in the coverage area of the mobile telecommunications network.

* * * * *